United States Patent
Kwon et al.

(10) Patent No.: US 12,199,693 B2
(45) Date of Patent: Jan. 14, 2025

(54) ELECTRONIC DEVICE PERFORMING HIGH-SPEED POWER LINE COMMUNICATION AND OPERATING METHOD THEREOF

(71) Applicant: SAMSUNG ELECTRONICS CO., LTD., Suwon-si (KR)

(72) Inventors: Minkyu Kwon, Suwon-si (KR); Guntak Kwak, Suwon-si (KR); Dongjoon Kim, Suwon-si (KR); Hyoungseok Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/133,819

(22) Filed: Apr. 12, 2023

(65) Prior Publication Data

US 2024/0022285 A1    Jan. 18, 2024

(30) Foreign Application Priority Data

Jul. 15, 2022  (KR) .......................... 10-2022-0087524

(51) Int. Cl.
*H04B 3/54* (2006.01)
*H04B 3/56* (2006.01)

(52) U.S. Cl.
CPC ................. *H04B 3/54* (2013.01); *H04B 3/56* (2013.01); *H04B 2203/5441* (2013.01); *H04B 2203/5462* (2013.01)

(58) Field of Classification Search
CPC .... H04B 3/54; H04B 3/56; H04B 2203/5404; H04B 2203/5429; H04B 2203/5441; H04B 2203/5462; H04B 2203/5483
USPC ................. 375/257; 340/12.31, 12.32, 13.23
See application file for complete search history.

(56) References Cited

U.S. PATENT DOCUMENTS

| | | |
|---|---|---|
| 10,298,036 B2 | 5/2019 | Choi |
| 2007/0098026 A1* | 5/2007 | Uesaka ................... H01S 5/042 |
| | | 372/29.01 |
| 2011/0222154 A1 | 9/2011 | Choi et al. |
| 2017/0013346 A1 | 1/2017 | Lee et al. |
| 2017/0133862 A1 | 5/2017 | Jung et al. |

(Continued)

FOREIGN PATENT DOCUMENTS

KR    10-2011-0102758 A    9/2011

*Primary Examiner* — Young T. Tse
(74) *Attorney, Agent, or Firm* — Sughrue Mion, PLLC

(57) ABSTRACT

An electronic device includes a power line communication circuit configured to perform power line communication with an external device, the power line communication circuit including: a power line switch provided between a regulator output node and a POGO output node; and a pull-up resistance provided between the POGO output node and a power supply voltage; and a processor configured to control the power line communication circuit, wherein the processor is further configured to: based on receiving a start signal instructing an initiation of high-speed communication, turn off the power line switch to block an electrical coupling between the regulator output node and the POGO output node, and perform the high-speed communication with the external device by connecting coupling the POGO output node to the power supply voltage through the pull-up resistance or connecting coupling the POGO output node to a ground voltage, based on according to output data.

20 Claims, 14 Drawing Sheets

(56) References Cited

U.S. PATENT DOCUMENTS

| | | |
|---|---|---|
| 2018/0184191 A1 | 6/2018 | Kim et al. |
| 2020/0274346 A1* | 8/2020 | Ding ...................... H02H 3/085 |
| 2021/0250063 A1* | 8/2021 | Kwon ...................... H04B 3/54 |
| 2022/0222063 A1* | 7/2022 | Bang ........................ G06F 8/65 |
| 2024/0176404 A1* | 5/2024 | Kogo ........................ H02J 3/38 |

* cited by examiner

ELECTRONIC DEVICE PERFORMING HIGH-SPEED POWER LINE COMMUNICATION AND OPERATING METHOD THEREOF

CROSS-REFERENCE TO RELATED APPLICATION

This application is based on and claims priority under 35 U.S.C. § 119 to Korean Patent Application No. 10-2022-0087524, filed on Jul. 15, 2022, in the Korean Intellectual Property Office, the disclosure of which is incorporated by reference herein in its entirety.

BACKGROUND

The present disclosure relates to an electronic device, and more particularly, to a method for performing high-speed power line communication (PLC), and an electronic device performing the method.

PLC may be used in various fields as a technology for performing communications by encoding voice and/or data into frequency signals that may be carried through a power line (e.g., a cable, a wire) that supplies power. For example, PLC may be used for performing communications between wearable devices (e.g., earbuds) and cradles for charging and/or storing the wearable devices. That is, the earbuds may communicate with a mobile device by using wireless communications (e.g., Bluetooth, Bluetooth Low Energy (BLE), Wireless Fidelity (WiFi), and the like) and transmit data received from the mobile device to a cradle by using PLC. For example, if a cradle firmware update is necessary, the earbuds may receive data necessary for the firmware update from the mobile device and transmit the received data to the cradle by using PLC.

The structure of the data transmitted from the earbuds to the cradle may include a preamble, a header, a data message, and a parity bit, and the cradle may transmit a response signal (ACK) in response to the receipt of data from the earbuds.

There exists a need for further improvements in PLC, as the need for fast (e.g., high throughput, high bandwidth) communications using PLC may be constrained by limited speed constraints of related PLC devices. For example, PLC between wearable devices (e.g., earbuds) and a cradle may be performed at a low data speed due to speed constraints. However, there is a demand for faster PLC, such that a user may directly perform a firmware update of a cradle, for example.

SUMMARY

Example embodiments provide a method for an electronic device to perform power line communication at a high speed.

According to an aspect of an example embodiment, an electronic device includes: a power line communication circuit configured to perform power line communication with an external device, the power line communication circuit including: a power line switch provided between a regulator output node and a POGO output node; and a pull-up resistance provided between the POGO output node and a power supply voltage; and a processor configured to control the power line communication circuit, wherein the processor is further configured to: based on receiving a start signal instructing an initiation of high-speed communication, turn off the power line switch to block an electrical coupling between the regulator output node and the POGO output node, and perform the high-speed communication with the external device by connecting coupling the POGO output node to the power supply voltage through the pull-up resistance or connecting coupling the POGO output node to a ground voltage, based on according to output data.

According to an aspect of an example embodiment, an electronic device includes: a near field communication circuit configured to perform near field communication with a first external device; a power line communication circuit configured to perform, with a second external device, low-speed power line communication and high-speed power line communication; and a processor configured to control the power line communication circuit and the near field communication circuit, wherein the processor is further configured to: transmit, to the second external device using the low-speed power line communication, a start signal instructing an initiation of high-speed communication, the start signal having been received from the first external device, identify whether a communication mode of the second external device has switched from a low-speed communication mode to a high-speed communication mode, and based on identifying that the communication mode of the second external device has switched to the high-speed communication mode, transmit, to the second external device using the high-speed power line communication, data received from the first external device.

According to an aspect of an example embodiment, a method of performing high-speed power line communication by an electronic device, includes: based on receiving a start signal instructing an initiation of high-speed power line communication, blocking an electrical coupling between a regulator output node and a POGO output node; and after the blocking the electrical coupling between the regulator output node and the POGO output node, performing the high-speed power line communication with an external device by: electrically coupling a pull-up resistance to a power line communication circuit coupling the POGO output node to a power supply voltage through the pull-up resistance or coupling the POGO output node to a ground voltage, based on output data.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Hereinafter, embodiments of the present disclosure are described in detail with reference to the accompanying drawings.

Figure 1:
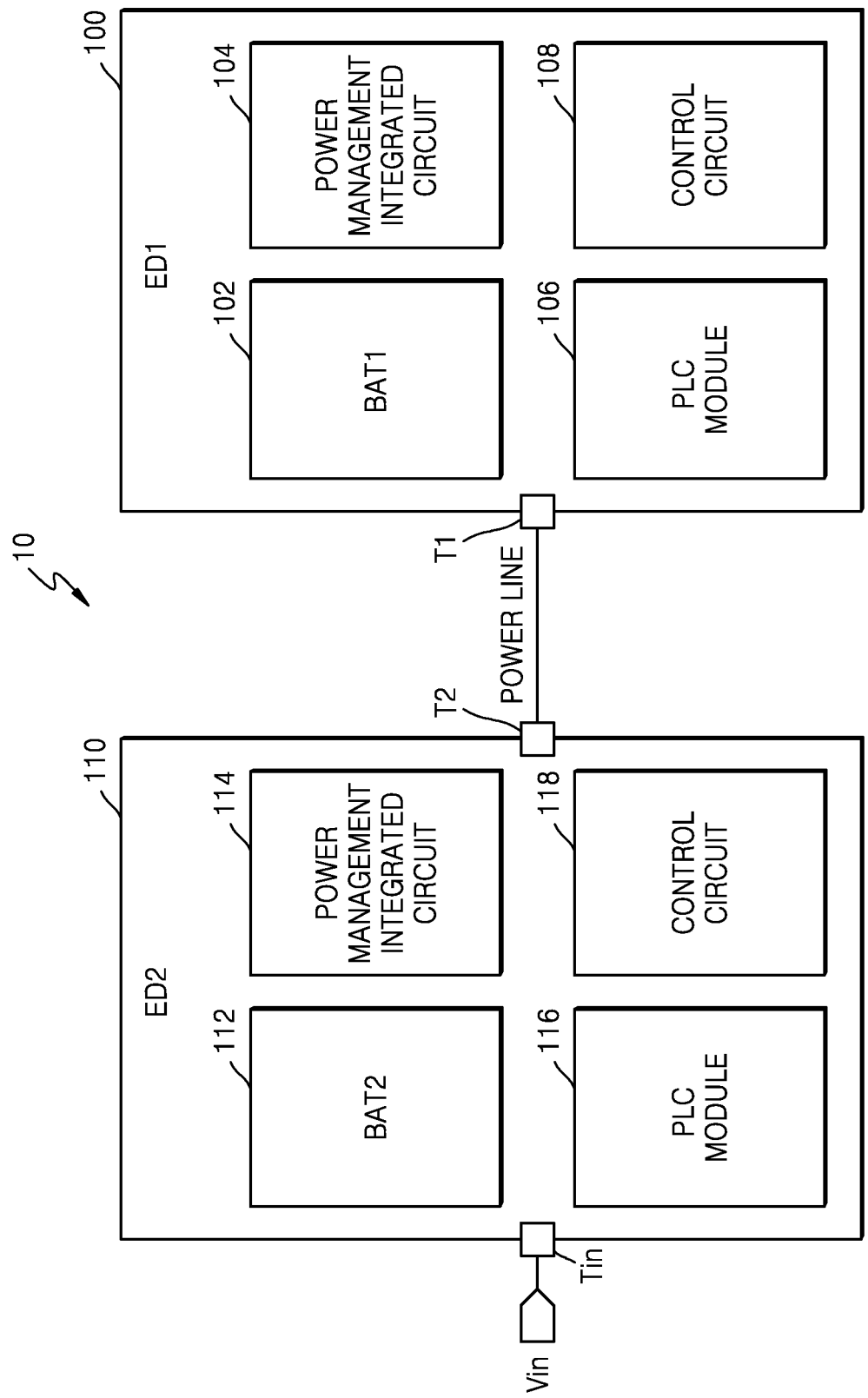
FIG. 1 illustrates a mobile system, according to an embodiment.

FIG. 1 illustrates a mobile system 10 according to an embodiment. Referring to FIG. 1, the mobile system 10 includes a first electronic device (ED1) 100 and a second electronic device (ED2) 110. The ED1 100 may be electrically connected (e.g., coupled) with the ED2 110 through a power line. The ED1 100 and the ED2 110 may perform power line communication (PLC) by transmitting and/or receiving power and/or data through the power line. The ED1 100 may include a first connection terminal T1 that may be electrically connected with the ED2 110 via a second connection terminal T2 of the ED2 110. The ED1 100 may receive power from the ED2 110 and/or transmit and/or receive data to and/or from the ED2 110 through the first terminal T1 and the second connection terminal T2. The first connection terminal T1 may be electrically connected with the second connection terminal T2 through the power line. Although FIG. 1 illustrates that the ED1 is connected with the ED2 through one power line, the number of power lines and the voltage and/or current transmitted through each power line are not limited thereto.

PLC is a communication technology for transmitting power and/or data through a power line. For example, the power line may be implemented through an electrical contact between the first connection terminal T1 and the second connection terminal T2. The ED1 100 and the ED2 110 may transmit and/or receive power and/or data through the power line. The ED1 100 may perform data communication with the ED2 110 through the first connection terminal T1 that may receive power, without being provided with a separate connection terminal or connection pin for data communication with the ED2 110. Alternatively or additionally, the ED2 110 may perform data communication with the ED1 100 through the second connection terminal T2 that may supply power, without being provided with a separate connection terminal or connection pin for data communication with the ED1 100. Accordingly, the size of each of the ED1 100 and the ED2 110 may be miniaturized.

The ED1 100 may include a first battery BAT1 102, a power management integrated circuit 104, a PLC module or PLC circuit 106, and a control circuit 108. The charged state of the first battery BAT1 102 may include an over-discharged state, a normal state, and a fully-charged state. The power management integrated circuit 104 may change the method of charging the first battery BAT1 102 according to the charged state of the first battery BAT1 102.

The PLC module 106 may receive power from the ED2 110 and/or transmit and/or receive data to and/or from the ED2 110, based on the control of the control circuit 108. For example, the PLC module 106 may modulate a voltage signal and/or a current signal to be output through the first connection terminal T1, and may demodulate a voltage signal and/or a current signal received through the first connection terminal T1. That is, the ED1 100 may include a current source, a current modulator, and/or a voltage demodulator (not shown), configured to receive data through the demodulation of the voltage signal and/or the current signal and/or to transmit data through the modulation of voltage signal and/or the current signal.

The control circuit 108 may control the overall operation of the ED1 100. For example, the communication of the ED1 100 with the ED2 110 may be controlled by controlling the PLC module 106. According to an embodiment, the control circuit 108 may include a micro control unit (MCU) configured to control the PLC module 106 and/or the power management integrated circuit 104. Alternatively or additionally, the MCU of the control circuit 108 may be configured to control the power management integrated circuit 104 to control the charging method of the first battery BAT1 102. However, the embodiments of the present disclosure are not limited thereto, and the control circuit 108 may include a processor, a central processing unit (CPU), or the like.

Similar to the ED1 100, the ED2 110 may include a second battery BAT2 112, a power management integrated circuit 114, a PLC module or PLC circuit 116, and a control circuit 118. According to an embodiment, the ED2 110 may further include an input voltage terminal Tin for receiving an input voltage Vin from the outside (e.g., an external device, a power outlet). For example, the input voltage terminal Tin may receive the input voltage Vin from an alternating current (AC) power source and/or from a direct current (DC) power source, such as, but not limited to, a household power source, a computer (via an universal serial bus (USB) port, for example), and an auxiliary battery. According to an embodiment, the ED2 110 may wirelessly receive the input voltage VIN from the outside (e.g., near-field radiative techniques such as capacitive coupling and inductive coupling, and far-field radiative techniques such as power beaming using microwaves and/or laser beams). The present disclosure is not limited in this regard.

The power management integrated circuit 114 may charge the second battery BAT2 112 based on the input voltage Vin received from the outside. The charged state of the second battery BAT2 112 may include the over-discharged state, the normal state, and the fully-charged state. The power management integrated circuit 114 may change the method of charging the second battery BAT2 112 according to the charged state of the second battery BAT2 112.

The PLC module 116 may supply power to the ED1 100 and/or transmit and/or receive data to and/or from the ED1 100, based on the control of the control circuit 118. For example, the PLC module 116 may modulate a voltage signal and/or a current signal to be output through the second connection terminal T2, and/or may demodulate a voltage signal and/or a current signal received through the second connection terminal T2. That is, the ED2 110 may include a current source, a current modulator, and/or a voltage demodulator, configured to receive data through the demodulation of the voltage signal and/or the current signal and/or configured to transmit data through the modulation of the voltage signal and/or the current signal.

The control circuit 118 may control the overall operation of the ED2 110. For example, the control circuit 118 may control the PLC module 116 to control communication of the ED2 110 with the ED1 100, and may control the power management integrated circuit 114 to control the power that is supplied to the ED1 100. According to an embodiment, the control circuit 118 may include an MCU configured to control the PLC module 116 and/or the power management integrated circuit 114. Alternatively or additionally, the MCU of the control circuit 118 may be configured to control the power management integrated circuit 104 to control the charging method of the first battery BAT1 102. However, the embodiments of the present disclosure are not limited thereto, and the control circuit 118 may include a processor, a central processing unit (CPU), or the like.

According to an embodiment, the ED1 100 may be a wearable device (e.g., a wireless earbud, a wireless earphone, a smart watch, a fitness tracker, a biometric device, an augmented reality (AR) headset, a virtual reality (VR) headset, an artificial intelligence (AI) hearing aid, web-enabled glasses, Bluetooth headsets, and the like), and the ED2 110 may be a device configured to charge and/or store the wearable device (e.g., a wireless earbud charger, a wireless earbud cradle, a wireless earphone charger, and the like). However, the present disclosure is not limited in this regard. In some embodiments, the ED1 100 may be the charging/storing device and the ED2 110 may be the wearable device.

Figure 2A:
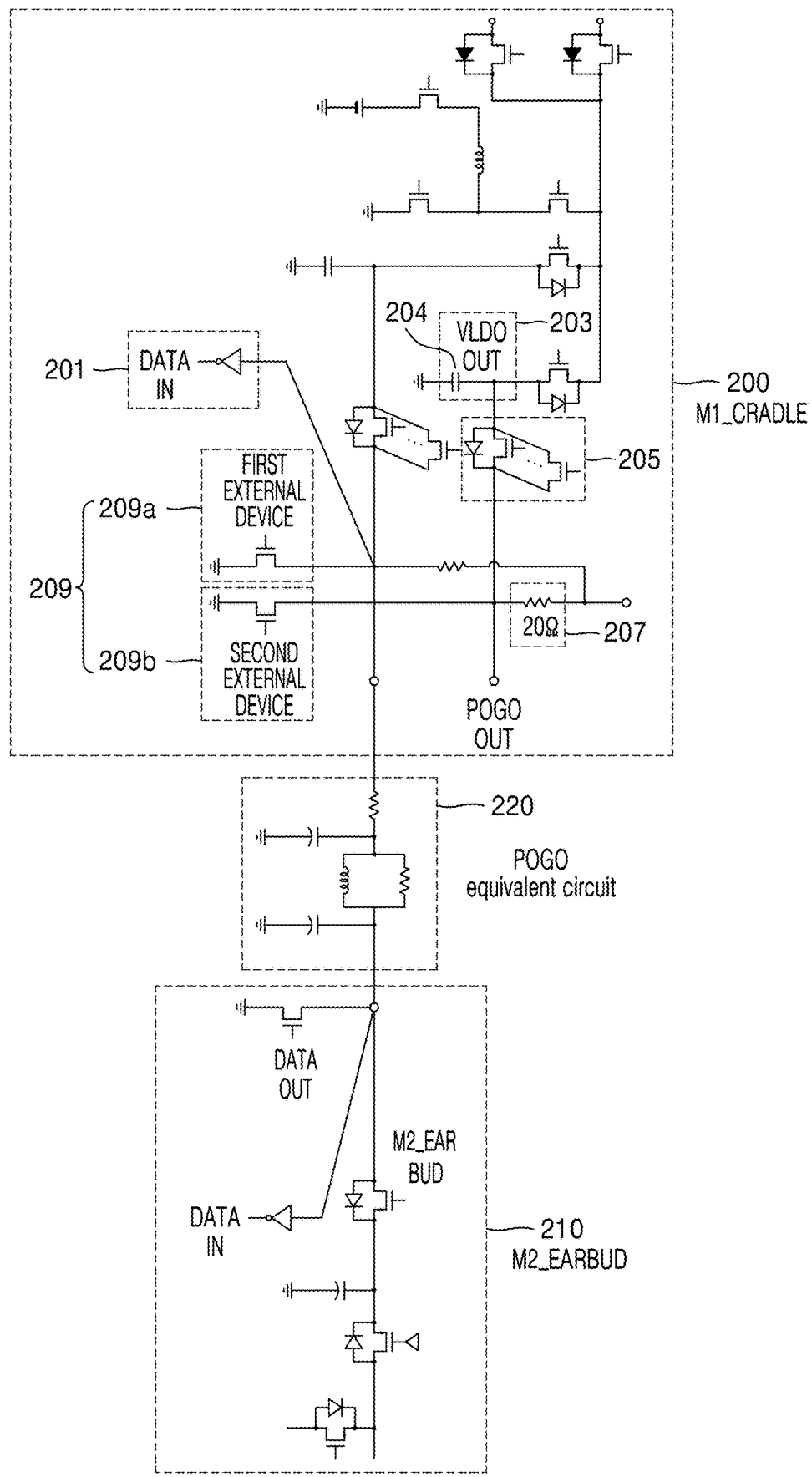
FIG. 2A illustrates a circuit of an electronic device and an external device, the circuit including a power line communication module, according to an embodiment.

FIG. 2A illustrates a circuit, including a PLC module, of an electronic device and an external device, according to an embodiment.

According to an embodiment, the electronic device M1_CRADLE may be a cradle that may keep and/or charge the external device, and the external device M2_EARBUD may refer to an earbud (e.g., a wearable device). The electronic device M1_CRADLE and the external device M2_EARBUD may each include PLC modules for performing PLC with each other. Referring to FIG. 2A, a first PLC module of the electronic device M1_CRADLE and a second PLC module of the external device M2_EARBUD may perform PLC. Hereinafter, a first communication circuit 200 included in the first PLC module of the electronic device M1_CRADLE may be connected to a second communication circuit 210 included in the second PLC module of the external device M2_EARBUD through a POGO equivalent circuit 220 to perform PLC. Although FIG. 2A illustrates that the POGO equivalent circuit 220 and the second communication circuit 210 connected with the POGO equivalent circuit 220 are connected with only one POGO OUT node, the POGO equivalent circuit 220 and the second communication circuit 210 may be connected with other (e.g., additional) POGO outputs. For example, two POGO equivalent circuits that may transmit and/or receive data to and/or from each of a left earbud and a right earbud may be connected. Hereinafter, for ease of explanation and conciseness, it is assumed that there is one POGO equivalent circuit 220 and one second communication circuit 210, but it should be understood that the POGO equivalent circuit 220 (and/or multiple POGO equivalent circuits) may be connected, via multiple POGO OUT nodes, to multiple electronic devices and/or multiple wearable devices.

The electronic device M1_CRADLE and the external device M2_EARBUD may perform high-speed PLC and/or low-speed PLC. Low speed PLC may refer to a communication method of transmitting and/or receiving data at a speed of several kilo-Hertz/bit (KHz/bit) (e.g., less than 10 kHz/bit), and high-speed PLC may refer to a communication method of transmitting and/or receiving data at a speed of tens to hundreds of kHz/bit (e.g., more than 10 kHz/bit).

The first communication circuit 200 may include a data receiver 201, a regulator output node 203, a power line switch 205, a pull-up resistance 207 connected (e.g., coupled) to the POGO OUT node, a data outputter 209, and a plurality of transistors. Although FIG. 2A illustrates that the first communication circuit 200 includes components such as the pull-up resistance 207 and the power line switch 205, embodiments are not limited thereto, and the second communication circuit 210 may include the pull-up resistance 207 and the power line switch 205.

The data receiver 201 may be a node configured to receive data input from an external device M2_EARBUD. As shown in FIG. 2A, the data receiver 201 may include an inverter. The data receiver 201 may receive an input data DATA IN based on the voltage level and/or the current level provided by the second communication circuit 210, and may receive a logic state in which the voltage level and/or the current level from the second communication circuit 210 is inverted and provided as input data DATA IN. That is, a logic state of the input data DATA IN may be inverted from a logic state of the voltage level and/or the current level provided by the second communication circuit 210.

When output data DATA OUT of a logic low level (e.g., '0') is input to a metal oxide semiconductor field effect transistor (MOSFET) N-type metal oxide semiconductor (NMOS) included in the data outputter 209, the MOSFET NMOS may turn off and a voltage level corresponding to a logic high level (e.g., '1') may be transmitted to the second communication circuit 210 according to the power voltage connected through the pull-up resistance 207. Alternatively or additionally, when output data DATA OUT of the logic high level is input to the MOSFET NMOS, the MOSFET NMOS may turn on and a voltage level corresponding to the logic low level may be transmitted to the second communication circuit 210. That is, the logic level of the voltage level transmitted to the second communication circuit 210 and the logic state of the output data DATA OUT may have opposite values (e.g., inverted).

The data outputter 209 may include a first data outputter 209a and a second data outputter 209b. The first data outputter 209a and the second data outputter 209b each may output data to different external devices. That is, the first data outputter 209a may output data to a first external device, and the second data outputter 209b may output data to a second external device. For example, if the external device M2_EARBUD is a pair of earbuds, the first data outputter 209a may output data to the left earbud, and the second data outputter 209b may output data to the right earbud. However, the present disclosure is not limited in this regard. For example, the first data outputter 209a may output data to the right earbud, and the second data outputter 209b may output data to the left earbud.

Data output voltage for the data outputter 209 may not be directly transmitted to the external device M2_EARBUD and may be used to drive the voltage transmitted to the external device M2_EARBUD. For example, the electronic device M1_CRADLE may generate a POGO output voltage by using the data output voltage, and may output the POGO output voltage to the external device M2_EARBUD via the POGO OUT node.

The regulator output node 203 may convert the voltage supplied from an external power source (e.g., a household power outlet) into a required voltage VLDO OUT and provide the voltage VLDO OUT to the electronic device M1_CRADLE. For example, a voltage supplied from the external power source may be converted to the VLDO OUT voltage in a range necessary for the electronic device M1_CRADLE to operate (e.g., between approximately 4.6 Volts and 4.8 Volts).

An input/output capacitor 204 may be connected to the regulator output node 203, as shown in FIG. 2A. Connecting a capacitor to the POGO OUT node may cause an increase in the output voltage, which may interfere with performing PLC at a high speed. However, when the input/output capacitor 204 is connected to the regulator output node 203, as shown in FIG. 2A, communication at a lower voltage (e.g., 1.8V) may be possible. As such, electronic devices in which the input/output capacitor 204 is connected to the regulator output node 203 may perform high-speed PLC.

The power line switch 205 is a switch configured to separate the input/output capacitor from the POGO OUT node. As described above, low power (e.g., low voltage levels) may be need to be used to drive high-speed PLC. However, when the input/output capacitor 204 is connected with the POGO OUT node, driving high-speed PLC may be difficult due to an increase in voltage. Alternatively or additionally, the charge and discharge of the input/output capacitor 204 may interfere with performing high-speed communication. The PLC module 116 may turn the power line switch 205 on and/or off in response to receiving a signal indicating whether to perform low-speed PLC or high-speed PLC.

For example, when the power line switch 205 is on, the input/output capacitor 204 may be connected with the POGO OUT node and the electronic device M1_CRADLE may be configured to perform the low-speed PLC with the external device M2_EARBUD. In some embodiments, the electronic device M1_CRADLE may use the low-speed PLC to charge the electronic device M1_CRADLE and to perform simple data transmission and/or reception operations. Simple data transmission and/or reception operations may refer to, for example but not limited to, transmitting data regarding a battery state of an electronic device M1_CRADLE to an external device M2_EARBUD. However, the data transmission and/or reception operations are not limited thereto, and various types and/or quantities of data and/or control commands may be transmitted and/or received.

Alternatively or additionally, when the power line switch 205 is off, the input/output capacitor 204 may be disconnected from the POGO OUT node and the electronic device M1_CRADLE may be configured to perform high-speed PLC with the external device M2_EARBUD. An example of a method for the electronic device M1_CRADLE to perform high-speed PLC with the external device M2_EARBUD is described in reference to FIGS. 6 and 7.

The POGO OUT node is a node through which data is output from the electronic device M1_CRADLE to the external device M2_EARBUD. In some embodiments, the POGO OUT node may include two nodes that may be connected with each of a first external device and a second external device. For example, a first POGO OUT node may be connected with the first external device, and a second POGO OUT node may be connected with a second external device to transmit data. The data input to the POGO OUT node may be driven by the data input to the data outputter 209.

The pull-up resistance 207, which is connected to the POGO OUT node, may have a predetermined value (e.g., 20 ohms (Ω)). According to an embodiment, the pull-up resistance 207 may be included only in the first communication circuit 200 and may not be included in the second communication circuit 210. In some embodiments, the second communication circuit 210 may not include a pull-up power supply. Alternatively or additionally, the second communication circuit 210 may include the pull-up power supply. When the value of the pull-up power supply included in the second communication circuit 210 is different from the value of the pull-up power supply included in the first communication circuit 200, a circuit for leveling the pull-up power supply values may need to be provided.

The second communication circuit 210 may be included in the PLC module included in the external device M2_EARBUD (e.g., PLC module 106 of FIG. 1). Although FIG. 2A illustrates only one second communication circuit 210, the second communication circuit 210 may be included in each of the two external devices. For example, the second communication circuit 210 of each of the two external devices may be connected to the first communication circuit 200 through a POGO equivalent circuit 220 to perform PLC with the first communication circuit 200. That is, when the left and right earbuds are inserted into the cradle, both of the earbuds may be connected with the cradle through the POGO equivalent circuit 220 to perform PLC.

The electronic device M1_CRADLE may change the speed of the PLC based on a circuit state of the PLC module. For example, the electronic device M1_CRADLE may be configured to operate in a low-speed PLC mode in which the electronic device M1_CRADLE and the external device M2_EARBUD communicate at a speed less than a predetermined value, and to operate in a high-speed PLC mode in which communication is performed at a speed equal to or greater than the predetermined value. For example, in the low-speed PLC mode, the electronic device M1_CRADLE may communicate with the external device M2_EARBUD at a speed of several kHz/bit, and, in the high-speed PLC mode, the electronic device M1_CRADLE may communicate with the external device M2_EARBUD at a speed of tens of kHz/bit to hundreds of kHz/bit. The electronic device M1_CRADLE may communicate with the external device M2_EARBUD at the low-speed PLC mode in the default state, and may switch to the high-speed PLC mode when a signal is received indicating to switch to the high-speed PLC. Hereinafter, a process performed by the electronic device M1_CRADLE to switch to the high-speed PLC mode is described.

The electronic device M1_CRADLE may receive a firmware update start signal. According to an embodiment, the firmware update start signal may be received by the external device M2_EARBUD from a mobile device by using a short-range wireless communication module (e.g., a Bluetooth module, a Bluetooth Low Energy (BLE) module, a Wireless Fidelity (WiFi) module, a near-field communication (NFC) module) and transmitted to the electronic device M1_CRADLE, by the external device M2_EARBUD, through PLC. The electronic device M1_CRADLE may transmit a response signal to the external device M2_EARBUD in response to the firmware update start signal.

The electronic device M1_CRADLE may initiate a process for switching the PLC mode after transmitting the response signal. First, the electronic device M1_CRADLE may turn off the power line switch 205. The power line switch 205 may be turned off so that the input/output capacitor and the POGO OUT (output) node may be electrically separated. Next, the electronic device M1_CRADLE may block a regulator power. The electronic device M1_CRADLE may block the regulator power by discharging the input/output capacitor 204 connected to the bottom of the regulator output node 203. Finally, the electronic device M1_CRADLE may connect the pull-up resistance 207 to the POGO OUT (output) node. The pull-up resistance 207 may be electrically connected to or separated from the first communication circuit 200 through a switch (not shown). For example, the first communication circuit 200 may further include a switch for connecting and/or separating the pull-up resistance to and/or from the first communication circuit 200, and the PLC module 106 may electrically connect and/or separate the pull-up resistance 207 to and/or from the first communication circuit 200 based on the control of the processor of the control circuit 108. A method of electrically connecting and/or separating the pull-up resistance 207 to and/or from the first communication circuit 200 is described in FIG. 2B.

The electronic device M1_CRADLE may perform PLC at a high speed after the pull-up resistance 207 is electrically connected thereto. When the electronic device M1_CRADLE switches from the low-speed PLC mode to the high-speed PLC mode, the elements of the first communication circuit 200 may be changed in the order described above. When the changing of the circuit elements described above is performed out of order (e.g., in a different order), an input power of the electronic device M1_CRADLE may collide with the regulator power of the electronic device M1_CRADLE, thereby causing damage to the circuit. The electronic device M1_CRADLE in the high-speed PLC mode may be use a voltage (1.8 V) lower than the voltage (e.g., 4.6 V to 4.8 V) used in the low-speed PLC mode. As described above, a high voltage may interfere with driving the high-speed communication, and thus, the high-speed PLC may be performed by using a low voltage.

When the external device M2_EARBUD performs high-speed PLC with the electronic device M1_CRADLE, data received from the mobile device may be streamed to the electronic device M1_CRADLE. For example, if first data is received from the mobile device, the external device M2_EARBUD may transmit the first data directly to the electronic device M1_CRADLE without storing the first data in a memory of the external device M2_EARBUD. According to an embodiment, the external device M2_EARBUD may transmit the first data to electronic device M1_CRADLE and simultaneously receive second data from the mobile device.

The external device M2_EARBUD may be electrically connected with the electronic device M1_CRADLE through the POGO equivalent circuit 220, and may receive an input voltage from the electronic device M1_CRADLE through the POGO equivalent circuit 220. The electronic device M1_CRADLE may perform various functions by applying one or more voltage levels to the external device M2_EARBUD. Voltage levels applied to the external device M2_EARBUD for the electronic device M1_CRADLE to perform various functions may vary for each function. For example, the voltage level applied by the external device M2_EARBUD to the external device M2_EARBUD for charging the external device M2_EARBUD (e.g., 4.5 V) may differ from the voltage level applied to the external device M2_EARBUD for high-speed communication (e.g., 1.8 V). According to an embodiment, the electronic device M1_CRADLE may typically apply the voltage for charging the external device M2_EARBUD through the POGO equivalent circuit 220, and may change the level of the applied voltage when performing other functions (e.g., high speed communication).

The external device M2_EARBUD may detect (and/or determine) the switching of the communication mode of the electronic device M1_CRADLE based on the level of the voltage input from the electronic device M1_CRADLE. The external device M2_EARBUD may further include a detection circuit for detecting the level of the voltage input from the electronic device M1_CRADLE. For example, a first level voltage may be applied to the external device M2_EARBUD in the low-speed communication mode or in the low-speed communication mode for charging. When the communication mode of the electronic device M1_CRADLE is changed to the high-speed communication mode, a second voltage level lower than the first level may be applied to the external device M2_EARBUD. The external device M2_EARBUD may monitor the level of the changed input voltage, and, when the input voltage is less than the first level, may detect that the switching of the communication mode of the electronic device M1_CRADLE is initiated. When a voltage in a predetermined range from a second level is input, the external device M2_EARBUD may determine that the switching of the communication mode of the electronic device M1_CRADLE is completed.

The electronic device M1_CRADLE may transmit and/or receive data packets to and/or from the external device M2_EARBUD in the high-speed PLC mode. The electronic device M1_CRADLE may use, in the high-speed PLC mode, a data packet having a different form from that of the data packet used in the low-speed PLC mode. For example, an 11-bit data packet used as a response signal in the low-speed PLC mode may be decreased to a 2-bit data packet in the high-speed PLC mode. An example of a data packet used in the high-speed PLC mode is described in detail in reference to FIG. 3.

The electronic device M1_CRADLE may switch the PLC mode to the low-speed PLC mode in response to the reception of a high-speed PLC end command. When the high-speed PLC ends, the mobile device may transmit the end command to the external device M2_EARBUD. The external device M2_EARBUD may transmit the received end command to the electronic device M1_CRADLE. In response to receiving the end command from the external device M2_EARBUD, the electronic device M1_CRADLE may electrically separate the pull-up resistance 207 from the first communication circuit 200, supply the regulator power, and turn on the power line switch 205. An embodiment in which the electronic device M1_CRADLE switches from the high-speed PLC mode to the low-speed PLC mode is described in detail in reference to FIG. 7.

Figure 2B:
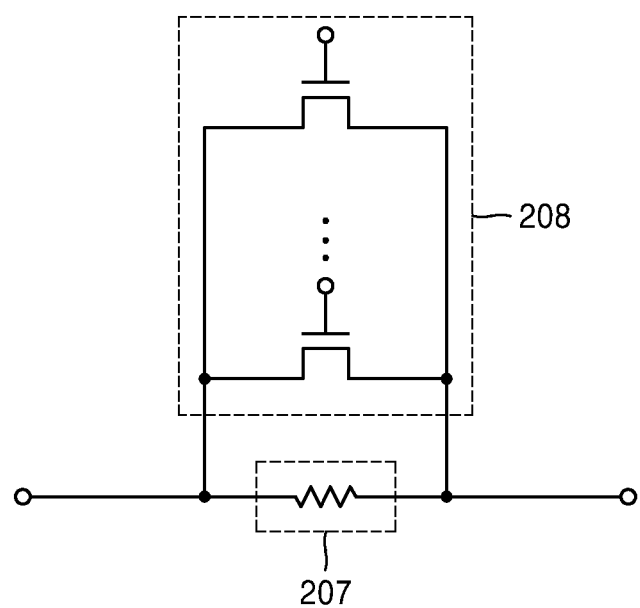
FIG. 2B illustrates a switch for electrically connecting or separating a pull-up resistance to or from a communication circuit in the electronic device, according to an embodiment.

FIG. 2B illustrates a switch for electrically connecting and/or separating the pull-up resistance to and/or from the communication circuit in the electronic device, according to an embodiment.

The electronic device M1_CRADLE may further include, in the first communication circuit 200, the pull-up resistance 207 and the switch 208 that may electrically connect and/or separate the pull-up resistance to and/or from the communication circuit for performing high-speed PLC with the external device M2_EARBUD. When the electronic device M1_CRADLE is configured to perform the low-speed PLC, the switch 208 may be turned on (e.g., switch is connected)

to electrically separate the pull-up resistance 207 from the first communication circuit 200. Alternatively or additionally, when the electronic device M1_CRADLE is configured to perform the high-speed PLC, the switch 208 may be turned off (e.g., switch is disconnected) to electrically connect the pull-up resistance 207 to the first communication circuit 200. When the pull-up resistance 207 is connected, the electronic device M1_CRADLE may perform the high-speed communication by connecting the data outputter 209 with a power supply voltage or a ground voltage based on the output data. For example, if the output data is a logic high (e.g., '1'), the data outputter 209 may be connected with the ground voltage and logic low data (e.g., '0') may be transmitted to the second communication circuit 210. Alternatively or additionally, when the output data is a logic low (e.g., '0'), the data outputter 209 may be connected with the power supply voltage through the pull-up resistance 207, and logic high data (e.g., '1') may be transmitted to the second communication circuit 210.

Figure 3A:
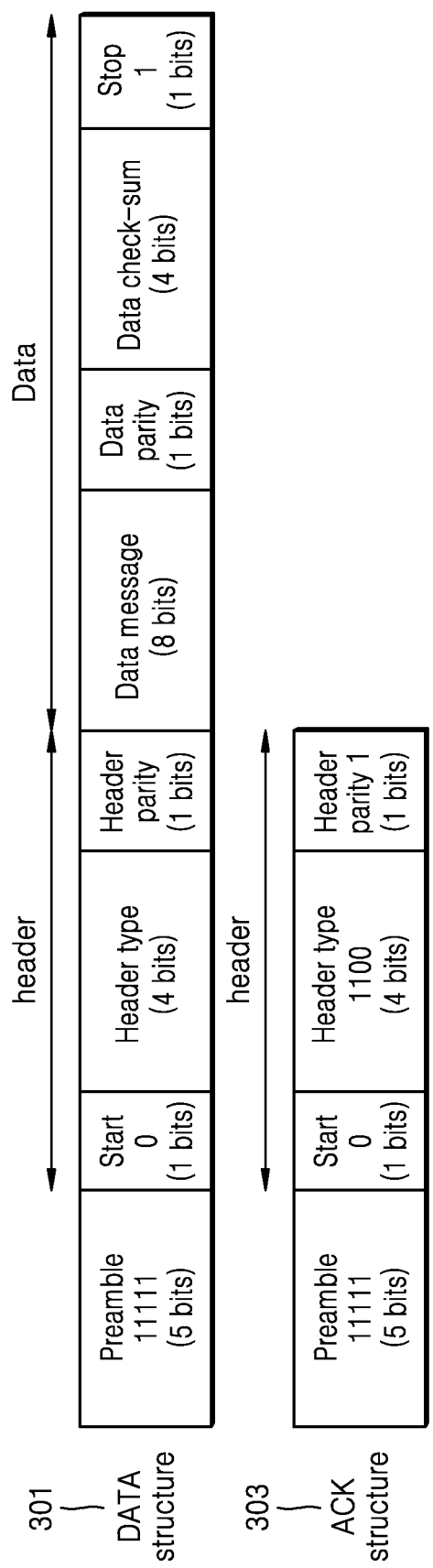
FIG. 3A illustrates a data packet transmitted and received between the electronic device and the external device in low-speed power line communication, according to an embodiment.

FIG. 3A illustrates a data packet transmitted and received between the electronic device M1_CRADLE and the external device M2_EARBUD in a low-speed PLC, according to an embodiment.

Referring to FIG. 3A, the electronic device M1_CRADLE may use a first data packet DATA 301 for transmitting data and a second data packet ACK 303 for responding (e.g., acknowledging) in the low-speed PLC mode. The first data packet DATA 301 may be transmitted from a transmission side to a reception side and may include a preamble region, a header region, and a data region. The preamble region, which is a bit row attached to the very front of each frame for bit motivation or frame motivation, may have a predetermined value. For example, the preamble may be determined to have a 5-bit value of 11111. However, the present disclosure is not limited in this regard. For example, other predetermined values having less or more bits may be used without deviating from the scope of the present disclosure.

The header region may be data that is appended to the front of a data block and may include information about a file. For example, in some embodiments, the header region may have a total dimension of 6 bits and may include a start bit field (e.g., having a dimension of 1 bit) for starting transmission, a header type field (e.g., having a dimension of 4 bits), and a parity bit field (e.g., having a dimension of 1 bit) for error detection. However, the present disclosure is not limited in this regard. For example, the header region may have a different total dimension and/or may include less or more fields without deviating from the scope of the present disclosure.

The data area may include a data message to be transmitted. For example, the data area (or field) that may include at least a portion of data such as, but not limited to, a remaining charge amount of the battery BAT1 of the electronic device M1_CRADLE, a firmware update history, and a sound (e.g., audio) source file. The data region may further include a data parity field (e.g., having a dimension of 1 bit), a data check-sum field (e.g., having a dimension of 4 bits), and a stop field (e.g., having a dimension of 1 bit) for detecting an error in the data message. However, the present disclosure is not limited in this regard. For example, the data area may have a different total dimension and/or may include less or more fields without deviating from the scope of the present disclosure.

The first data packet DATA 301 may include the preamble region, the header region, and the data area, and may have a predetermined size (e.g., 25 bits).

The second data packet ACK 303 may be data sent to the transmission side from the reception side, in response to the reception of the first data packet DATA 301, and may include the preamble region and the header region. A description of the data included in the preamble region and the header region of the second data packet ACK 303 is omitted because the contents of the second data packet ACK 303 may be the same as described in the first data packet DATA 301. The second data packet ACK 303 used in the low-speed PLC may be made of, for example, 11 bits.

The electronic device M1_CRADLE may determine that the first data packet DATA 301 is normally transmitted when the second data packet ACK 303 is received (e.g., ACK) within a predetermined time after the first data packet DATA 301 is transmitted. Alternatively or additionally, the electronic device M1_CRADLE may determine that the first data packet DATA 301 is not normally transmitted when the second data packet ACK 303 is not received (e.g., NACK) within a predetermined time after the first data packet DATA 301 is transmitted.

Figure 3B:
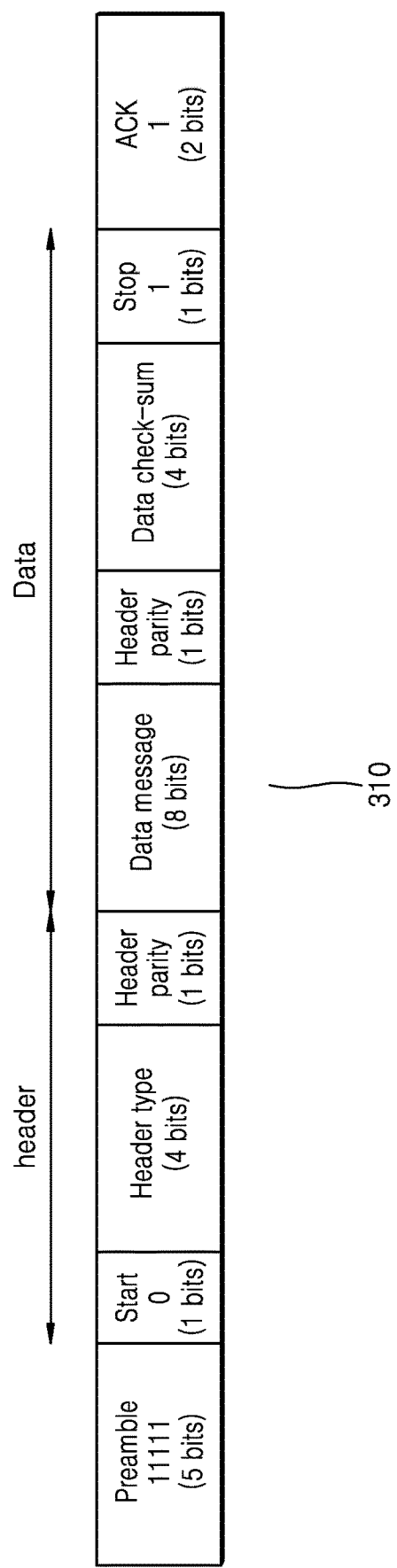
FIG. 3B illustrates a data packet transmitted and received between the electronic device and the external device in high-speed power line communication, according to an embodiment.

FIG. 3B illustrates a data packet transmitted and received between the electronic device and the external device in a high-speed PLC according to an embodiment.

The data packet 310 used by the electronic device M1_CRADLE for communication in the high-speed PLC may be different from the data packet used in low-speed PLC. In some embodiments, the transmission side of the high-speed PLC may transmit a data packet with the same form as that of the first data packet DATA 301. Alternatively or additionally, the reception side of the high-speed PLC may transmit a 2-bit response signal, not the second data packet ACK 303. The transmission side may determine that the response signal is normally transmitted when the response signal is received within a predetermined time. That is, communication speed may be improved by checking the transmission and reception of the data using a 2-bit response signal instead of the 11-bit second data packet 303. The transmission side may determine that the data is not normally transmitted if the response signal is not received during a time window of a predetermined time. The device of the transmission side may determine the length of the time window based on the time when the device of the reception side transmits 2 bits. The electronic device M1_CRADLE may further improve the speed of PLC by reducing the number of bits necessary for the transmission and reception of data to and from the external device M2_EARBUD. For example, if the electronic device M1_CRADLE performs a firmware update through the high-speed PLC, the time spent for the update may be significantly decreased (e.g., from 40 minutes in the low-speed PLC mode to 20 seconds in the high-speed PLC mode), and thus, a significant speed improvement may be expected (e.g. by about 200 times).

Figure 4:
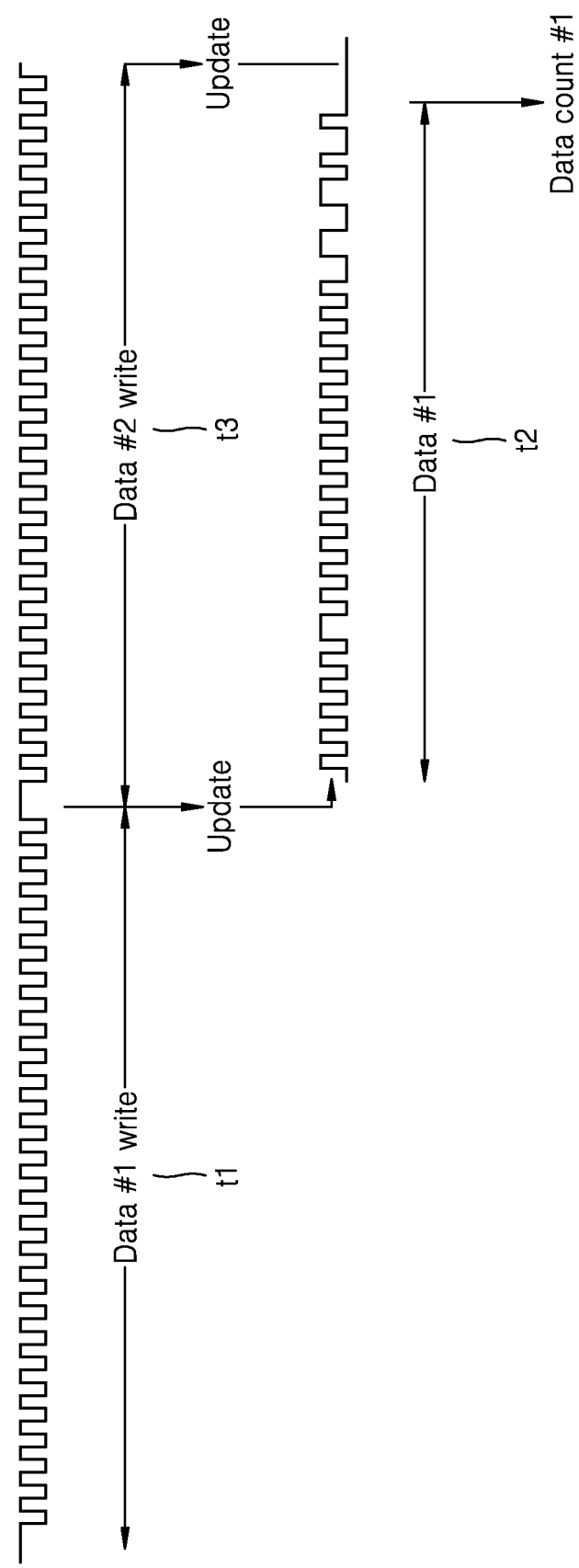
FIG. 4 is a view for explaining the transmission and reception of data between the electronic device and the external device, according to an embodiment.

FIG. 4 is a view for explaining the transmission and reception of data between the electronic device and the external device, according to an embodiment.

The electronic device M1_CRADLE may receive data from the external device M2_EARBUD. The external device M2_EARBUD may receive data from the mobile device and stream the data to the electronic device M1_CRADLE. Hereinafter, although the external device M2_EARBUD transmits data to the electronic device M1_CRADLE in an embodiment, it would be apparent that the embodiment of the present disclosure is not limited thereto and may include an embodiment where the electronic device M1_CRADLE transmits the data to the external device M2_EARBUD.

Referring to FIG. 4, the external device M2_EARBUD may receive first data during a predetermined time t1. The external device M2_EARBUD may receive second data from the mobile device during a predetermined time t3 after the reception of the first data has ended. The external device M2_EARBUD may stream the received first data to the electronic device M1_CRADLE during a predetermined time t2. Streaming may refer to the operation performed by a device of directly transmitting received data to another device without storing the received data in a memory of the device itself. According to an embodiment, the time t1 it takes for the external device M2_EARBUD to receive data from the mobile device (e.g. 72.5 microseconds (μsec)) may be longer than the time t2 it takes for the external device M2_EARBUD to transmit data to the electronic device M1_CRADLE (e.g., 65 μsec). The external device M2_EARBUD may prevent a bottleneck phenomenon that may occur when the external device M2_EARBUD streams the data to the electronic device M1_CRADLE by changing the time t1 for receiving data and the time t2 for transmitting the data.

The external device M2_EARBUD may increase the data count by a predetermined value by receiving the response signal from the electronic device M1_CRADLE. For example, if the transmission of one piece of datum is successful, a data count may be increased by 1. That is, if the transmission of the first data is successful, the external device M2_EARBUD may increase the data count to 1, and if the transmission of the second data is successful, the external device M2_EARBUD may increase the data count to 2. The external device M2_EARBUD may maintain the data count at 2 without increasing if the transmission of third data fails. The external device M2_EARBUD may determine the success and failure of data transmission by using the data count. Embodiments of the external device M2_EARBUD using the data count to determine the success and failure of the data transmission are explained in detail in reference to FIG. 5.

In some embodiments, data counting may not be performed by the external device M2_EARBUD, and may be performed by the electronic device M1_CRADLE that receives data. Hereinafter, the external device M2_EARBUD is described as performing the data counting, but it would be apparent that the electronic device M1_CRADLE may perform the same operation.

Figure 5:
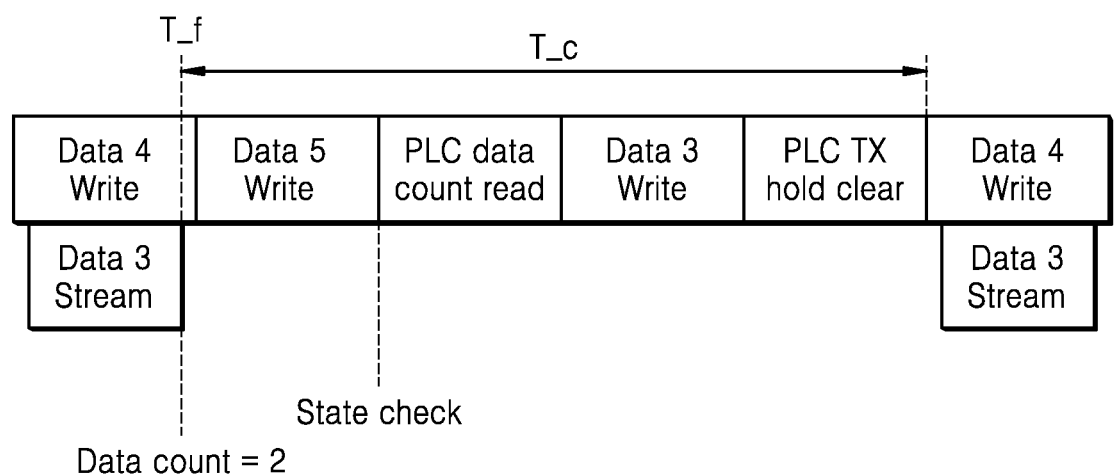
FIG. 5 illustrates a timeline when the power line communication between the electronic device and the external device has failed, according to an embodiment.

FIG. 5 illustrates a timeline when the PLC between the electronic device and the external device has failed, according to an embodiment.

FIG. 5 is a block in which the waveform shown in FIG. 4 is simplified. Referring to FIG. 5, the external device M2_EARBUD may transmit the third data to the external device M2_EARBUD (e.g., "Data 3 stream") while receiving fourth data (e.g., "Data 4 Write"). If the transmission of the third data has failed, the external device M2_EARBUD may not increase the data count at a time T_f when a transmission failure occurs. For example, if the third data is normally transmitted, the data count needs to be 3, but the data count may be maintained to 2 because the third data is not transmitted normally. The external device M2_EARBUD may receive fifth data (e.g., "Data 5 Write") from the mobile device regardless of the success or failure of the transmission of the third data. Because the response signal was not received due to the failure of the transmission of the third data NACK, the external device M2_EARBUD may check whether the electronic device M1_CRADLE has received the third data normally after receiving the fifth data (e.g., "State check"). For example, the external device M2_EARBUD may check the data count to determine that the third data is not transmitted normally (e.g., "PLC data count read"). If the third data is confirmed to not have been transmitted normally, the external device M2_EARBUD may hold the data streaming to the electronic device M1_CRADLE. After confirming that the third data is not transmitted normally, the external device M2_EARBUD may transmit a signal to re-transmit the third data to the mobile device. The mobile device may re-transmit the third data back to the external device M2_EARBUD (e.g., "Data 3 Write"). After the external device M2_EARBUD re-receives the third data from the mobile device, the external device M2_EARBUD may clear a data streaming hold with respect to the electronic device M1_CRADLE (e.g., "PLC TX hold clear"). According to another embodiment, the external device M2_EARBUD may clear the data streaming hold before re-receiving the third data. The external device M2_EARBUD may receive the fourth data from the mobile device (e.g., "Data 4 Write") and simultaneously transmit the third data to the electronic device M1_CRADLE (e.g., "Data 3 Stream"). The electronic device M1_CRADLE may take time to process data transmission failure from the time T_f when the third data transmission fails to the time T_c when the fourth data transmission starts.

Figure 6:
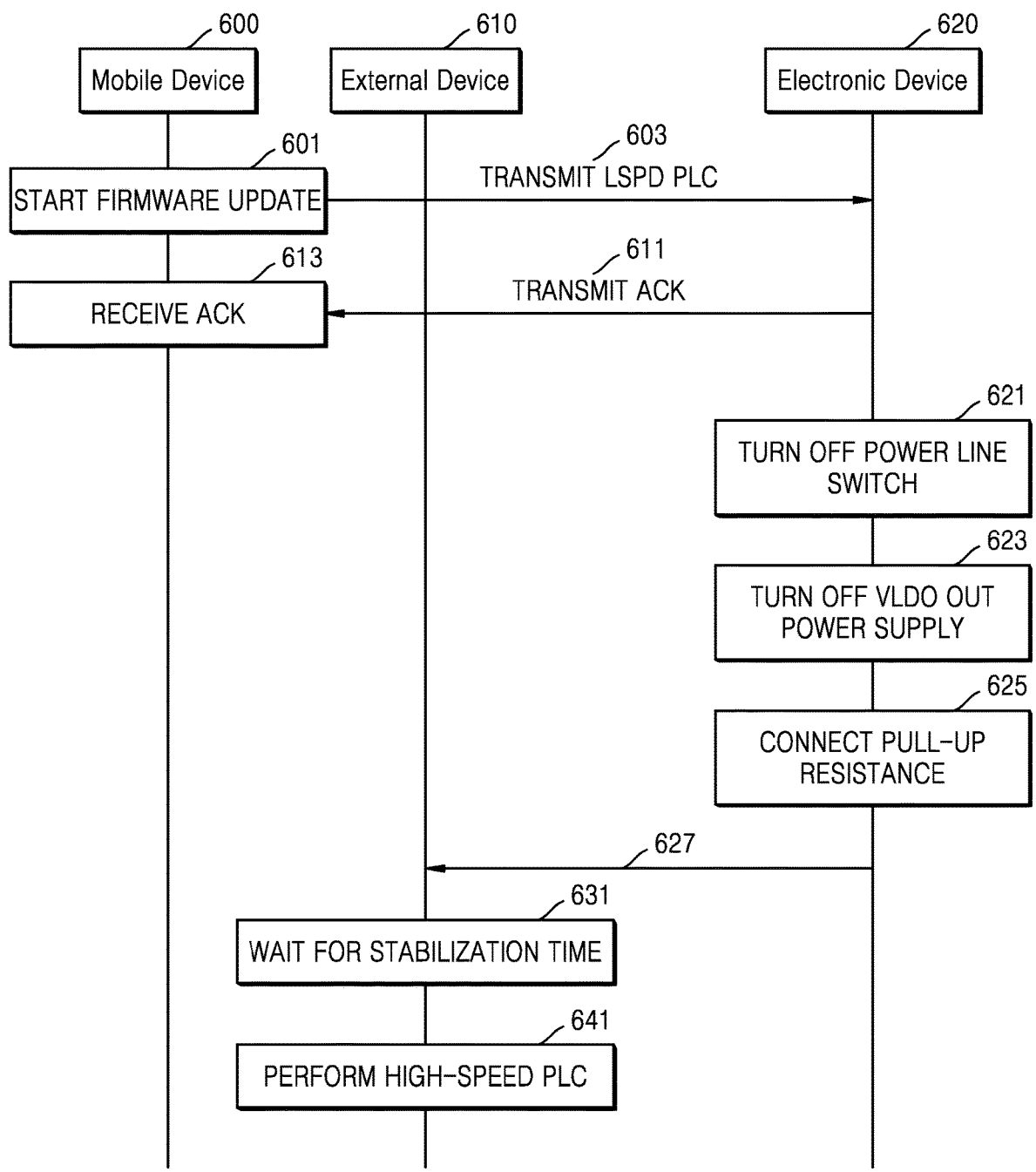
FIG. 6 is a view for explaining operations performed by the electronic device and the external device to start high-speed power line communication, according to an embodiment.

FIG. 6 is a view for explaining operations performed by the electronic device and the external device to start high-speed PLC, according to an embodiment.

Referring to FIG. 6, the external device 610 may include a near field wireless communication module or circuit for performing near field wireless communication (e.g., Bluetooth, BLE, Wi-Fi, etc.) in connection with the mobile device 600 and a first PLC module (e.g., PLC module 106 of FIG. 1) for performing PLC with the electronic device 620, and the electronic device 620 may include a second PLC module (e.g., PLC module 116 of FIG. 1) for performing PLC with the external device 610.

The external device 610 of FIG. 6 may include or may be similar in many respects to at least one of the ED1 100 described above in reference to FIG. 1 and the M2_EARBUD described above in reference to FIGS. 2A and 2B, and may include additional features not mentioned above. The electronic device 620 of FIG. 6 may include or may be similar in many respects to at least one of the ED2 110 described above in reference to FIG. 1 and the M1_CRADLE described above in reference to FIGS. 2A and 2B, and may include additional features not mentioned above.

The external device 610 may receive, from the mobile device 600, a firmware update start signal that instructs to initiate the firmware update (operation 601). For example, the external device 610 may receive the firmware update start signal via the near field wireless communication module. The external device 610 may transmit the received firmware update signal to the electronic device 620 via the first PLC module. For example, the external device 610 may transmit, and the electronic device 620 may receive the received firmware update signal through the second PLC module using low-speed PLC (operation 603). The electronic device 620 may transmit a response signal to the external device 610 in response to normally (e.g., successfully) receiving the firmware update start signal (operation 611). The external device 610 may receive, via the first PLC module, the response signal from the electronic device 620 and stream, via the near field wireless communication module, the response signal to the mobile device 600. At operation 613, the mobile device 600 may receive the response signal from the external device 610.

The electronic device 620 may initiate the switching of the PLC mode to the high-speed mode after transmitting the response signal regarding the firmware update start signal. At operation 621, the electronic device 620 may turn off the power line switch 205. The electronic device 620 may turn off the regulator power 203 at operation 623. At operation 625, the electronic device 620 may electrically connect the pull-up resistance 207 to switch the communication mode to the high-speed PLC mode. The electronic device 620 may transmit a signal indicating that the PLC mode switching is completed to the external device 610 at operation 627.

The external device 610 may perform a stabilization sequence for a predetermined time (e.g., 20 milliseconds (msec)) after receiving the signal indicating that the PLC mode switching is completed from the electronic device 620, at operation 631. After waiting for stabilization time is completed, at operation 641, the electronic device 620 and the external device 610 may perform high-speed PLC by transmitting and/or receiving data at a high speed, as described above in reference to FIGS. 3B, 4, and 5.

Figure 7:
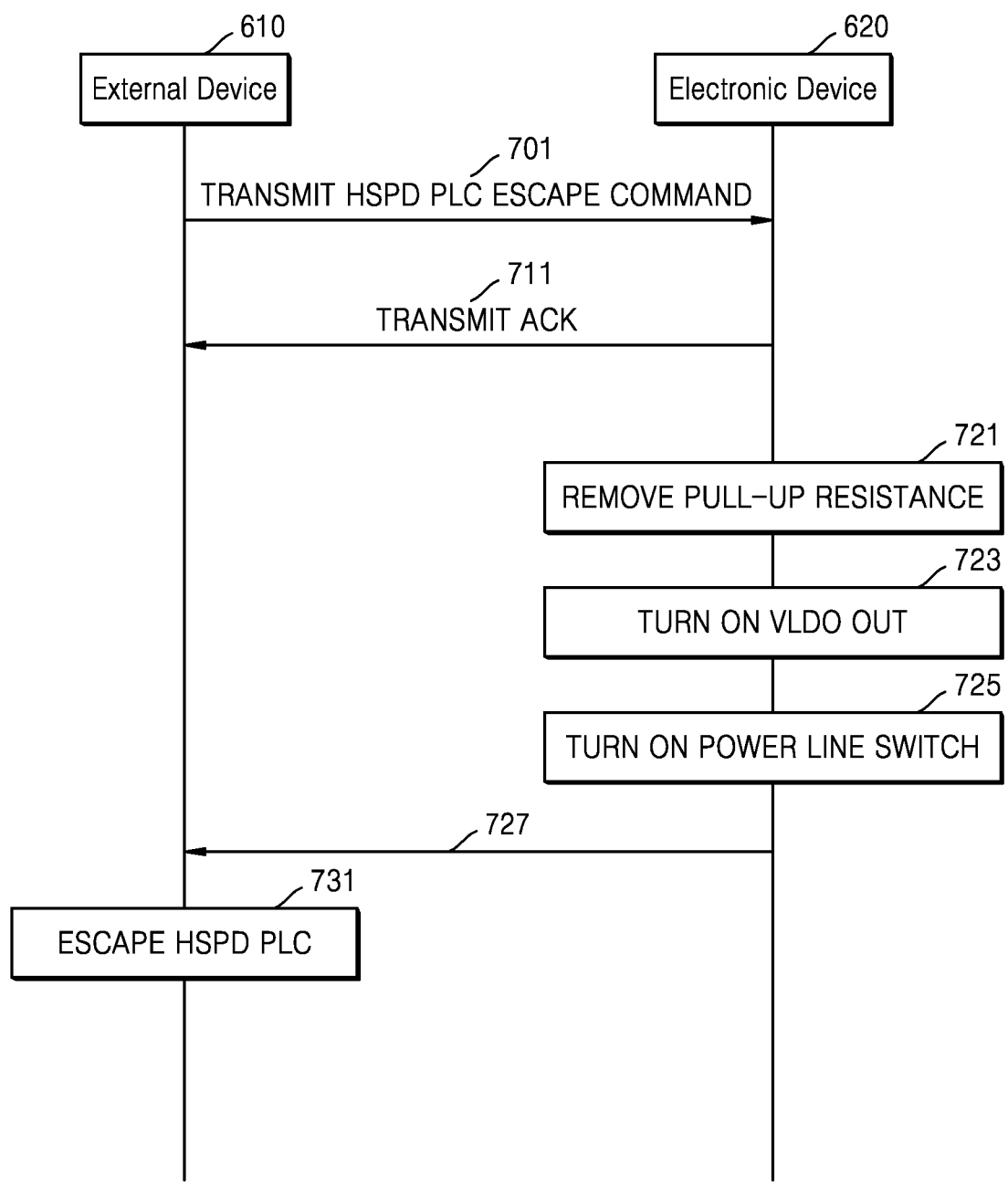
FIG. 7 is a view for explaining operations performed by the electronic device and the external device to transition out of the high-speed power line communication mode, according to an embodiment.

FIG. 7 is a view for explaining operations performed by the electronic device and the external device to transition out of the high-speed PLC mode, according to an embodiment.

In the high-speed PLC mode, when the transmission and reception of data is completed, the electronic device 620 may need to be switched to the low-speed PLC mode. For example, in some embodiments, charging of the electronic device 620 and the external device 610 may not be possible while the electronic device 620 and the external device 610 are in high-speed PLC mode. The external device 610 may receive an escape command after receiving the last data from the mobile device 600 (not shown). The external device 610 may transmit the received escape command to the electronic device 620 in operation 701. The electronic device 620 may transmit the response signal to the external device 610 after receiving the escape command in operation 711.

The electronic device 620 may be switched to the low-speed PLC mode by recovering the elements of the first communication circuit 200 that have been changed when switching from the low-speed PLC mode to the high-speed PLC mode. That is, the electronic device 620 may electrically separate the pull-up resistance 207 from the first communication circuit 200 in operation 721, supply the regulator power 203 in operation 723, and turn on the power line switch 205 in operation 725, to switch to the low-speed PLC mode.

After the switching to the low-speed PLC mode is completed, the electronic device 620 may transmit to the external device 610, in operation 727, a signal that indicates preparation for performing low-speed PLC has been completed. The external device 610 may, in response to receiving the signal, perform low-speed PLC with the electronic device 620 in operation 731.

Figure 8:
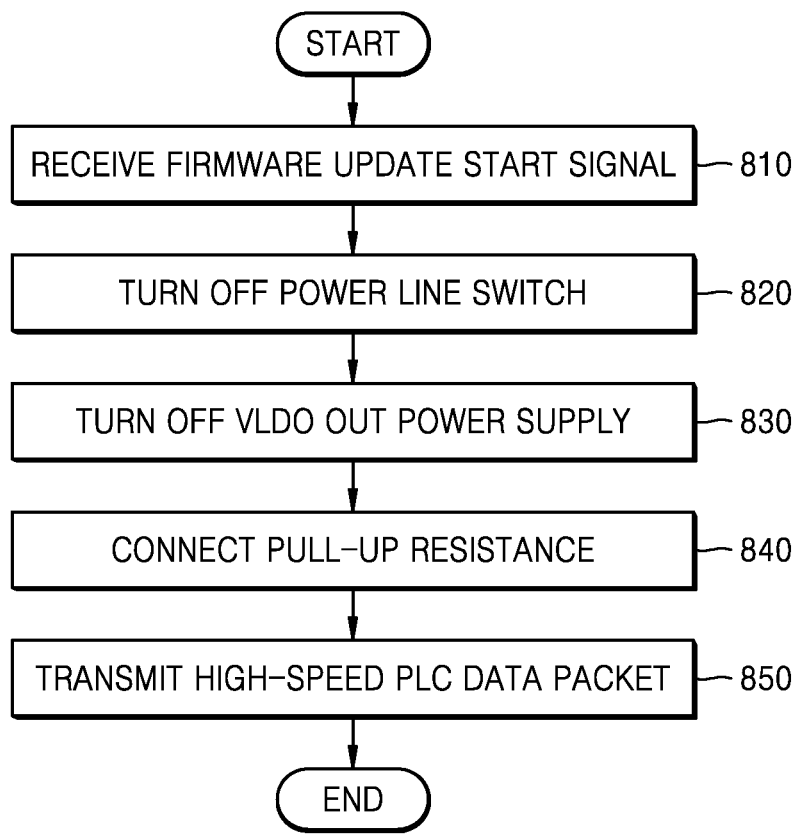
FIG. 8 is a view for explaining a method by which the electronic device performs high-speed power line communication, according to an embodiment.

FIG. 8 is a view for explaining a method by which the electronic device performs high-speed PLC, according to an embodiment.

In operation 810, the electronic device 620 may receive the firmware update start signal from the external device 610. The external device 610 may receive the firmware update start signal from the mobile device and transmit the signal to the electronic device 620. The external device 610 may perform near field wireless communication (e.g., Bluetooth, BLE, Wi-Fi) with the mobile device and PLC with the electronic device 620.

The electronic device 620 may switch to the high-speed PLC mode in response to receiving the firmware update start signal. The electronic device 620 may turn off the power line switch 205 in operation 820, turn off the regulator power 203 in operation 830, and connect the pull-up resistance 207 to the first communication circuit 200 in operation 840. In the high-speed PLC mode, the electronic device 620 may drive communication at a low voltage, and as a result, data may be transmitted and received at a faster speed when compared to the low speed PLC mode.

In operation 850, the electronic device 620 may perform high-speed PLC with the external device 610. The electronic device 620 may use a shorter data packet in the high-speed PLC than in the low-speed PLC. For example, the length of the response signal used in the high-speed PLC may be shorter than the length of the response signal used in the low-speed PLC. The electronic device 620 may determine that the data is normally transmitted when the response signal is received during the predetermined time window.

The electronic device 620 may receive the last data from the external device 610 and then switch from the high-speed PLC mode to the low-speed PLC mode. For example, the electronic device 620 may need to operate in the low-speed PLC mode to charge the external device 610. The electronic device 620 may be electrically separate the pull-up resistance 207 from the first communication circuit 200, supply the regulator power 203, and turn on the power line switch 205 to switch to the low-speed PLC mode.

Figure 9:
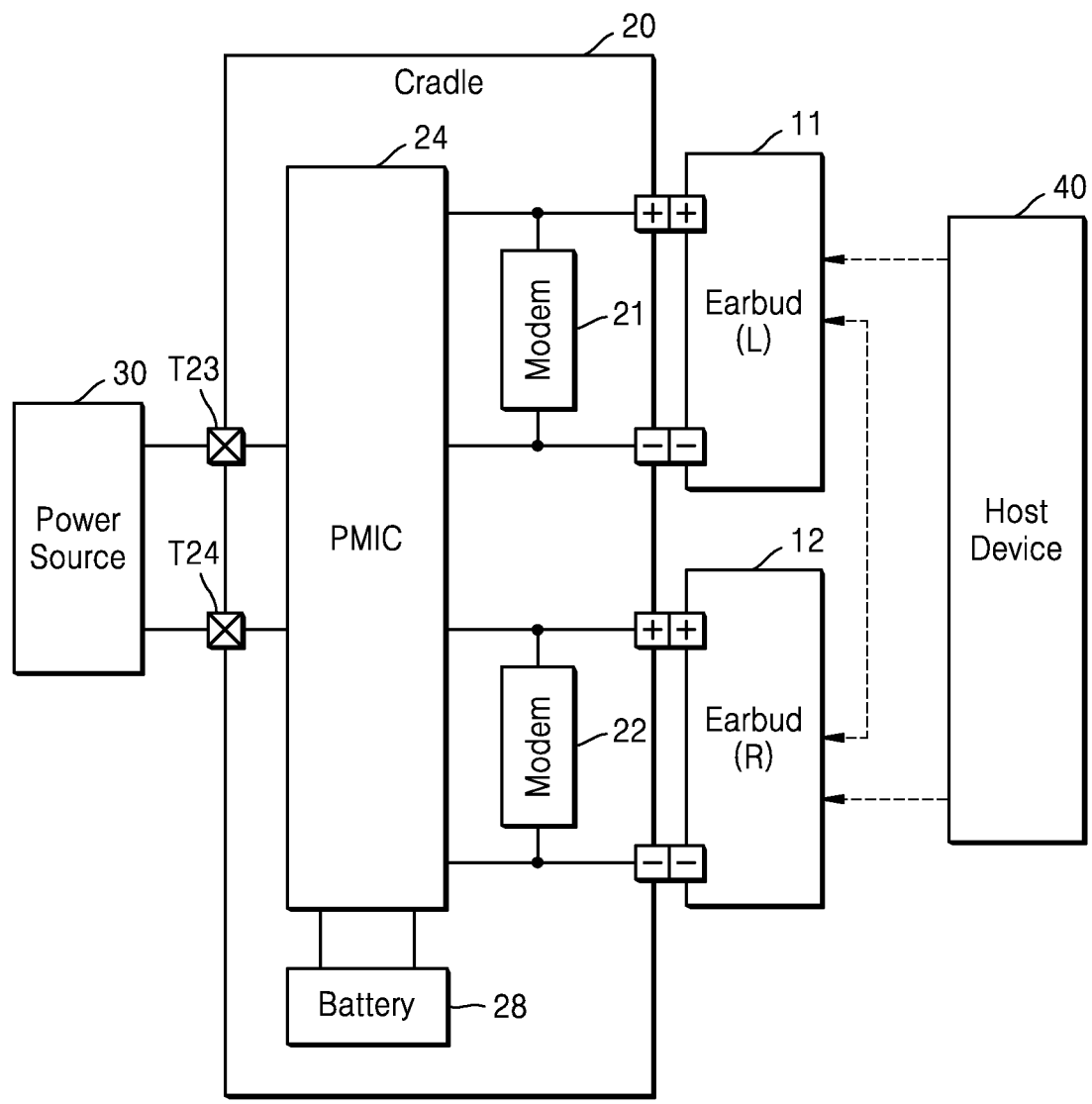
FIG. 9 is a view of electronic devices, according to another embodiment.

FIG. 9 is a block diagram illustrating an electronic device according to an example embodiment. Specifically, the block diagram of FIG. 9 shows a first earbud 11 and a second earbud 12 as electronic devices, a cradle 20, a power source 30 connected with the cradle 20, and a host device 40 that performs wireless communication with the first earbud 11 and the second earbud 12. Hereinafter, descriptions of FIG. 9 that overlap with the description of FIG. 1 are omitted.

For example, the first earbud 11 and the second earbud 12 of FIG. 9 may include or may be similar in many respects to at least one of the ED1 100 described above in reference to FIG. 1, the M2_EARBUD described above in reference to FIGS. 2A and 2B, and the external device 610 described above in reference to FIGS. 6-8, and may include additional features not mentioned above. For another example, cradle 20 of FIG. 9 may include or may be similar in many respects to at least one of the ED2 110 described above in reference to FIG. 1, the M1_CRADLE described above in reference to FIGS. 2A and 2B, and the electronic device 620 described above in reference to FIGS. 6-8, and may include additional features not mentioned above. For another example, the host device 40 may include or may be similar in many respects to the mobile device described above in reference to FIGS. 1-8, and may include additional features not mentioned above.

The first earbud 11 and the second earbud 12 may perform wireless communication with the host device 40 and may output sound (e.g., audio) from a source signal received from the host device 40. The host device 40 may be a device that provides a source signal to the first earbud 11 and the second earbud 12 through the wireless communication. For example, the host device 40 may be an electronic device such as, but not limited to, a smartphone, a tablet PC, and a laptop PC, or a fixed (e.g., not portable) device such as a TV, a multimedia player, and a desktop PC. Alternatively or additionally, the first earbud 11 and the second earbud 12 may perform mutual wireless communication. For example, the first earbud 11 and the second earbud 12 may perform mutual wireless communication for the purpose of synchronization, state delivery, and the like. Each of the first earbud 11 and the second earbud 12 may include a battery charged by power supplied from the cradle 20, and, as described above with reference to the drawings, may perform PLC with the cradle 20 using a low-speed PLC mode and/or a high-speed PLC mode. Accordingly, in the first earbud 11 and the second earbud 12, additional terminals for communicating with the cradle 20, other than a pair of terminals for charging, may be omitted, and the first earbud 11 and the second earbud 12 and the cradle 20 may have a simple structure. Particularly, the simple structure of the first earbud 11 and the second earbud 12 and the cradle 20 may provide various advantages because the first earbud 11 and the second earbud 12 and the cradle 20 may require small sizes.

The cradle 20 may function as a charger of the first earbud 11 and the second earbud 12, and may be portable. For example, the cradle 20 may include a battery 28 and may charge the first earbud 11 and the second earbud 12 through the power provided from the battery 28. In addition, the cradle 20 may include a third terminal T23 and a fourth terminal T24 to be connected to the power source 30, and may charge the battery 28 and the first earbud 11 and the second earbud 12 through the power supplied from the power source 30. In some embodiments, the cradle 20 may function as a case of the first earbud 11 and the second earbud 12. For example, the cradle 20 may have an internal structure in which the first earbud 11 and the second earbud 12 are seated, and may include a cover covering the first earbud 11 and the second earbud 12. As shown in FIG. 9, the cradle 20 may include a first modem 21, a second modem 22, a power management integrated circuit (PMIC) 24, and a battery 28.

The PMIC 24 may generate power supplied to the first earbud 11 and the second earbud 12 from the power supplied from the power source 30 and/or the battery 28. In some embodiments, the power source 30 may provide a 5V DC voltage based on a USB interface. In optional or additional embodiments, the PMIC 24 may generate a voltage and/or an electric current for charging the battery 28, and the PMIC 24 may generate a voltage and/or an electric current for charging the first earbud 11 and the second earbud 12. The first modem 21 may perform PLC with the first earbud 11, and the second modem 22 may perform PLC with the second earbud 12.

Figure 10:
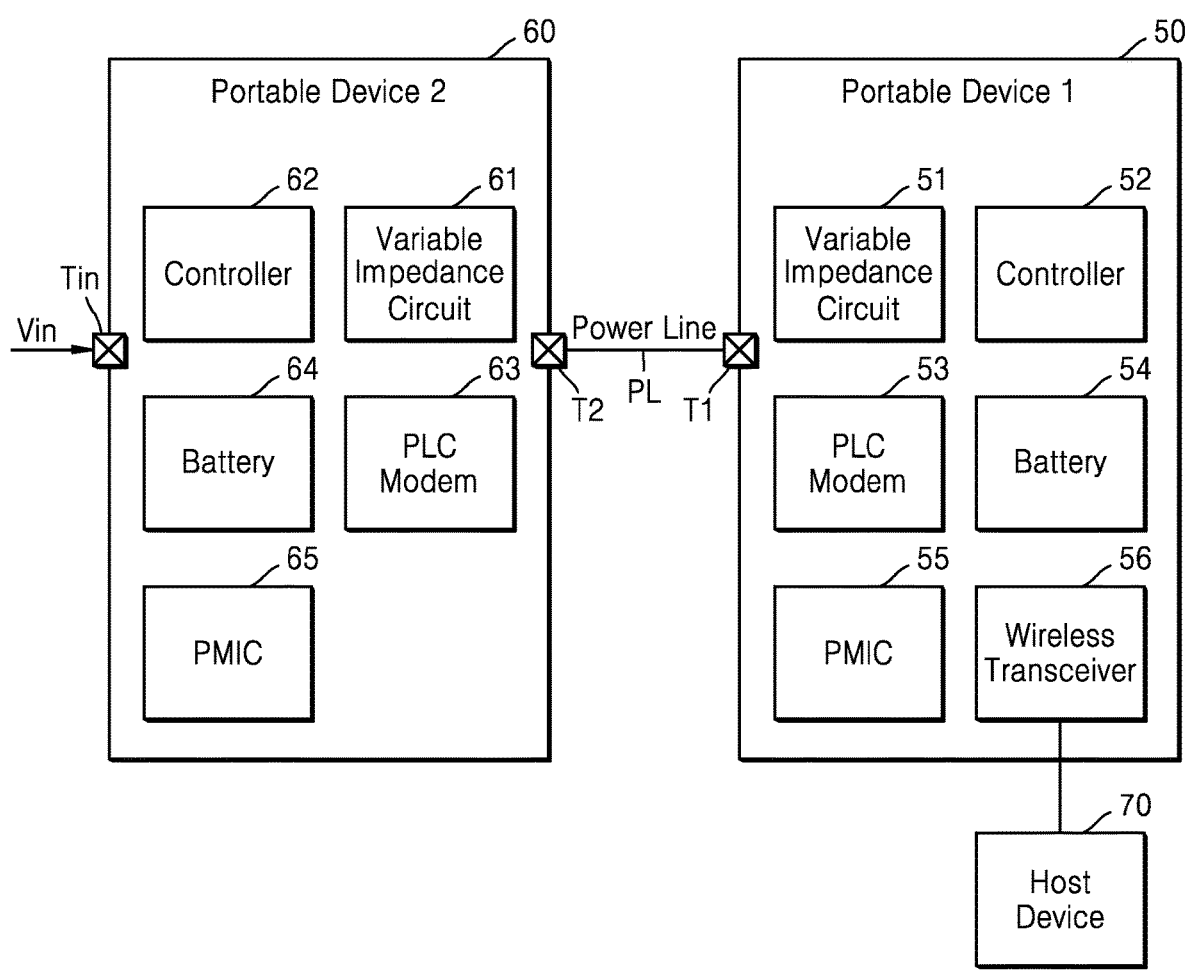
FIG. 10 is a view of electronic devices, according to another embodiment.

FIG. 10 is a block diagram illustrating a view of electronic devices, according to another example embodiment.

The portable device 1 (PD1) 50 may include a first terminal T1, a variable impedance circuit 51, a controller 52, a PLC modem 53, a battery 54, a PMIC 55, and a wireless transceiver 56. In some embodiments, the variable impedance circuit 51, the controller 52, the PLC modem 53, the battery 54, the PMIC 55, and the wireless transceiver 56 may be mounted on a printed circuit board. The PMIC 55 may manage the power of the battery 54. In some embodiments, the PD1 50 may further include a charger and a charging integrated circuit (IC).

The PD1 50 of FIG. 10 may include or may be similar in many respects to at least one of the ED1 100 described above in reference to FIG. 1, the M2_EARBUD described above in reference to FIGS. 2A and 2B, the external device 610 described above in reference to FIGS. 6-8, and the first earbud 11 and the second earbud 12 described above in reference to FIG. 9, and may include additional features not mentioned above. The portable device 2 (PD2) of FIG. 10 may include or may be similar in many respects to at least one of the ED2 110 described above in reference to FIG. 1, the M1_CRADLE described above in reference to FIGS. 2A and 2B, the electronic device 620 described above in reference to FIGS. 6-8, and the cradle 20 described above in reference to FIG. 9, and may include additional features not mentioned above. The host device 70 of FIG. 10 may include or may be similar in many respects to at least one of the mobile device described above in reference to FIGS. 1-8 and the host device 40 described above in reference to FIG. 9, and may include additional features not mentioned above.

The wireless transceiver 56 may perform wireless communication with the host device 70. For example, the wireless transceiver 56 may include a Bluetooth module and may receive data from the host device 70. For example, the host device 70 may include, but is not limited to, a smartphone, a tablet PC, a PC, a smart TV, a mobile phone, a personal digital assistant (PDA), a laptop, a media player, a micro server, a global positioning system (GPS), an electronic book terminal, a digital broadcast terminal, a navigation device, a kiosk, an MPEG-1 audio layer 3 (MP3) player, a digital camera, and/or other mobile or non-mobile computing devices. Alternatively or additionally, the host device 70 may be a wearable device such as a watch with a communication function and a data processing function, glasses, a hair band and a ring. In some embodiments, the wireless transceiver 56 of the PD1 50 may provide the data received from the host device 70 to the PD2 60 through PLC.

The PD2 60 may include a second connection terminal T2, an input terminal Tin, a variable impedance circuit 61, a controller 62, a PLC modem 63, a battery 64, and a PMIC 65. In some embodiments, the PD2 60 may include the variable impedance circuit 61, the controller 62, the PLC modem 63, the battery 64, and the PMIC 65. The PMIC 65 may manage the power of the battery 64. In some embodiments, the PD2 60 may further include a converter for converting the input voltage Vin received through the input terminal Tin.

Figure 11:
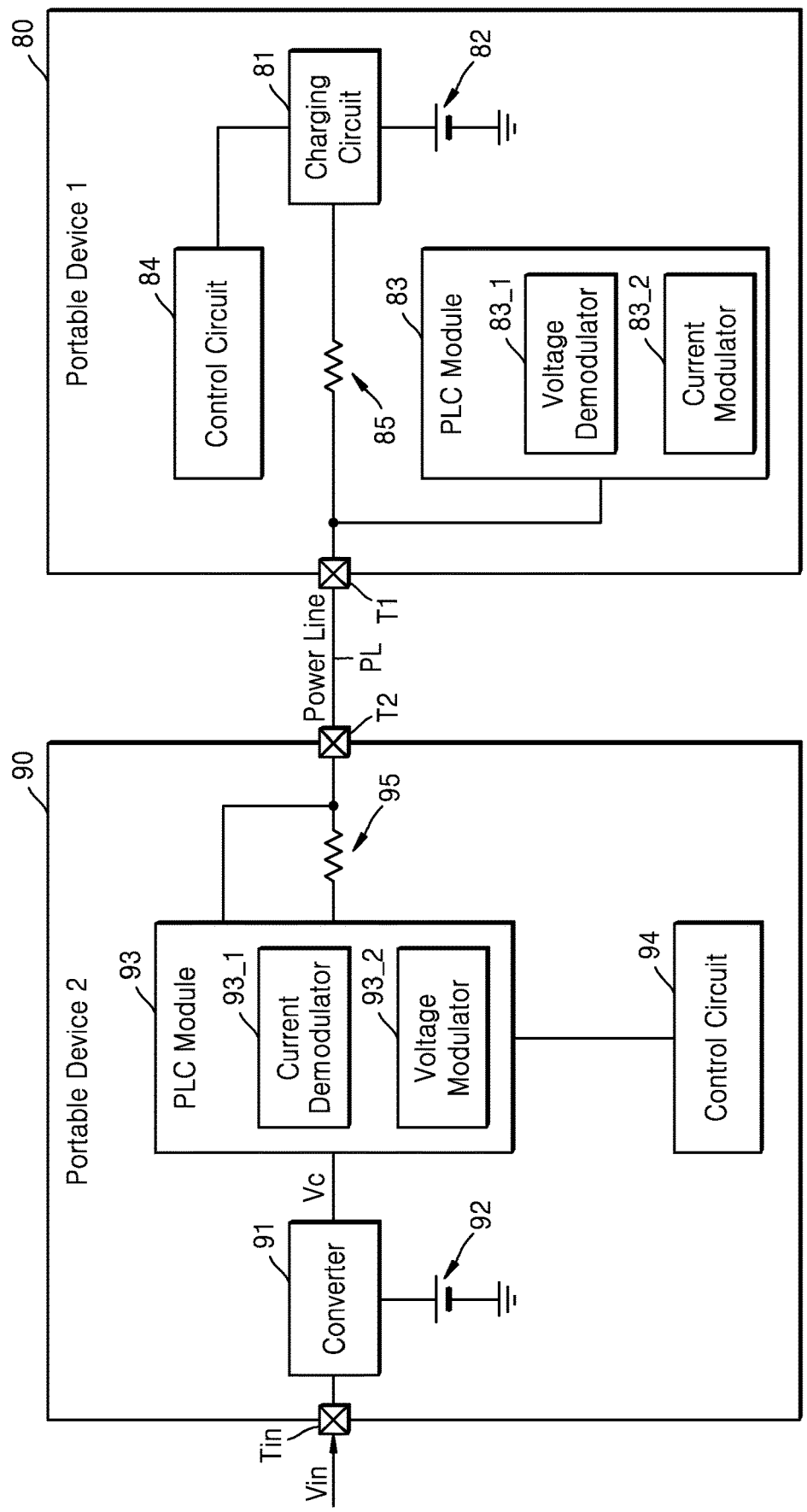
FIG. 11 is a view of electronic devices, according to another embodiment.

FIG. 11 is a block diagram illustrating a view of electronic devices, according to another example embodiment.

A portable device 1 (PD1) 80 may include a first connection terminal T1, an impedance circuit 85, a control circuit 84, a PLC module 83, a battery 82, and a charging circuit 81. In some embodiments, the charging circuit 81 may be a linear charger and may be implemented as a charging IC. The control circuit 84 may control the charging circuit 81 in a charging mode, and may charge the battery 82 based on the power received through a power line PL and the first connection terminal T1. Alternatively or additionally, the control circuit 84 may disable the charging circuit 81 in a data reception mode. The PD1 80 may operate based on the power provided by the battery 82. In some embodiments, the battery 82 may be charged based on the power received in a data transmission mode.

The PD1 80 of FIG. 11 may include or may be similar in many respects to at least one of the ED1 100 of FIG. 1, the M2_EARBUD of FIGS. 2A and 2B, the external device 610 of FIGS. 6-8, the first earbud 11 and the second earbud 12 of FIG. 9, and the PD1 50 of FIG. 10, and may include additional features not mentioned above.

The portable device (PD2) 90 may include a second connection terminal T2, an input terminal Tin, a converter 91, a battery 92, a PLC module 93, and a control circuit 94. The converter 91 may generate a voltage Vc converted from the input voltage Vin received through the input terminal Tin or the voltage of the battery 92. In some embodiments, the converter 91 may include a switching regulator and may include at least one of a boost converter, a buck converter, and/or a buck-boost converter as a DC-DC converter. Alternatively or additionally, the converter 91 may charge the battery 92 based on the input voltage Vin.

The PD2 90 of FIG. 11 may include or may be similar in many respects to at least one of the ED2 110 of FIG. 1, the M1_CRADLE of FIGS. 2A and 2B, the electronic device 620 of FIGS. 6-8, the cradle 20 of FIG. 9, and the PD2 60 of FIG. 10, and may include additional features not mentioned above.

The PLC module 83 of the PD1 80 may include a voltage demodulator 83_1 and a current modulator 83_2, and may further include a current source (not shown) in some embodiments. The current modulator 83_2 may perform current modulation under control of the control circuit 84. The current source may generate a modulated current signal (e.g., a current pulse), and the current signal may be output through the first terminal T1. The voltage demodulator 83_1 may demodulate the voltage signal received through the first terminal T1, and may provide the demodulated signal to the control circuit 84.

The PLC module 93 of the PD2 90 may include a current demodulator 93_1 and a voltage modulator 93_2. The control circuit 94 may control the current demodulator 93_1 and the voltage modulator 93_2. The voltage modulator 93_2 may generate a voltage signal modulated according to the control of the control circuit 94, and the voltage signal may be output through the second terminal T2. In some embodiments, the voltage modulator 93_2 may include a linear regulator, such as a low drop-out (LDO) regulator. The current demodulator 93_1 may demodulate the current signal received through the second terminal T2, and may provide the demodulated signal to the control circuit 94.

Figure 12:
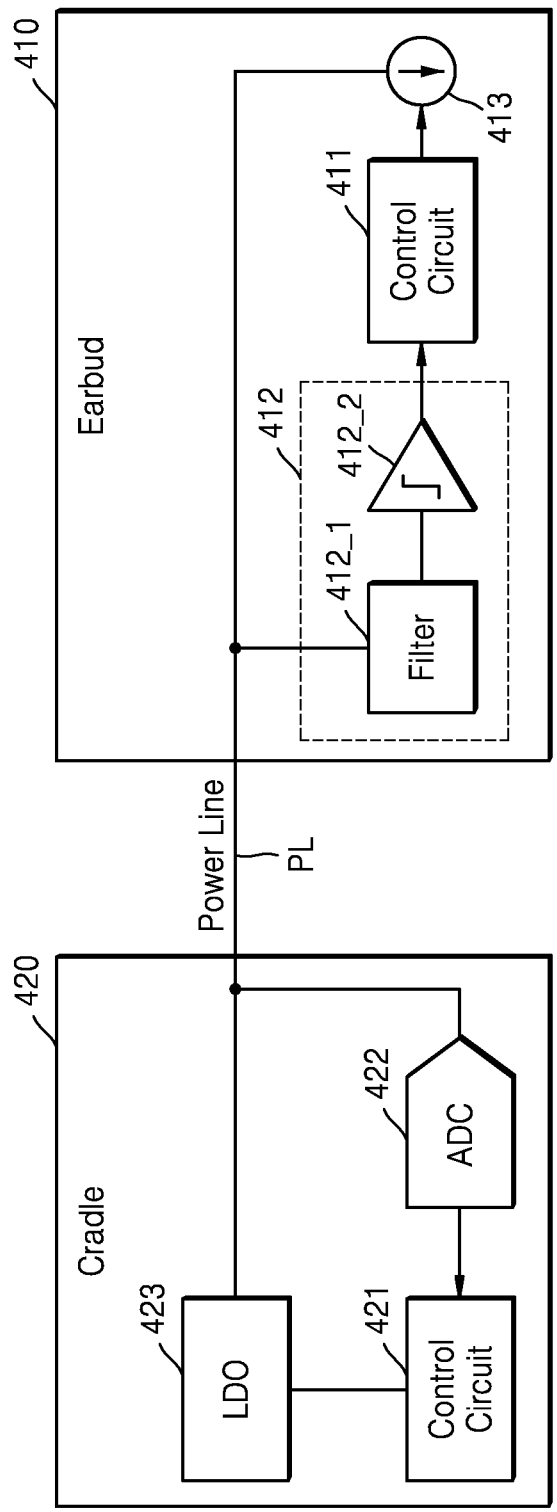
FIG. 12 is a view of electronic devices, according to another embodiment.

FIG. 12 is a block diagram illustrating a view of electronic devices, according to another example embodiment.

An earbud 410 may include a control circuit 411, a voltage demodulator 412, and a current modulator 413. The voltage demodulator 412 may include a filter 412_1 and an amplifier 412_2. A cradle 420 may include a control circuit 421, an analog-digital converter (ADC) 422, and an LDO regulator 423, the ADC 422 may perform current demodulation, and the LDO regulator 423 may perform voltage modulation.

The earbud 410 of FIG. 12 may include or may be similar in many respects to at least one of the ED1 100 of FIG. 1, the M2_EARBUD of FIGS. 2A and 2B, the external device 610 of FIGS. 6-8, the first earbud 11 and the second earbud 12 of FIG. 9, the PD1 50 of FIG. 10, and the PD1 80 of FIG. 11, and may include additional features not mentioned above. The cradle 420 of FIG. 12 may include or may be similar in many respects to at least one of the ED2 110 of FIG. 1, the M1_CRADLE of FIGS. 2A and 2B, the electronic device 620 of FIGS. 6-8, the cradle 20 of FIG. 9, the PD2 60 of FIG. 10 and the PD2 90 of FIG. 11, and may include additional features not mentioned above.

In the earbud 410, the filter 412_1 of the voltage demodulator 412 may remove a noise by blocking a specific frequency component of a voltage signal received through a power line PL, and the filtered voltage signal may be provided to the amplifier 412_2. The amplifier 412_2 may generate a signal having a logic high level and/or a logic low level by amplifying the voltage signal and provide the generated signal to the control circuit 411. The control circuit 411 may identify information transmitted by the cradle 420 based on the generated signal received from the amplifier 412_2, and may generate a modulated current signal transmitted through the power line PL by controlling the current modulator 413 to deliver the information to the cradle 420.

In the cradle 420, the ADC 422 may generate a digital signal from the current signal received through the power line PL and provide the digital signal to the control circuit 421. The control circuit 421 may identify the information transmitted by the earbud 410 based on the digital signal. Alternatively or additionally, the control circuit 421 may generate a modulated voltage signal transmitted through the power line PL by controlling the LDO regulator 423.

As described above, example embodiments are disclosed in the drawings and the specification.

While the present disclosure has been particularly shown and described with reference to embodiments thereof, it will be understood that various changes in form and details may be made therein without departing from the spirit and scope of the following claims.

What is claimed is:

1. An electronic device comprising:
  a power line communication circuit configured to perform power line communication with an external device, the power line communication circuit comprising:
    a power line switch coupled between a regulator output node and a first output node; and
    a pull-up resistor coupled between the first output node and a power supply voltage; and
  a processor configured to control the power line communication circuit, wherein the processor is further configured to:
    based on receiving a start signal instructing an initiation of high-speed communication, turn off the power line switch to block an electrical connection between the regulator output node and the first output node, wherein the high-speed communication comprises exchanging data at a speed equal to or greater than a predetermined value, and
    perform the high-speed communication by coupling the first output node to the power supply voltage through the pull-up resistor or coupling the first output node to a ground voltage through the pull-up resistor according to a logic level of input data of the power line communication circuit.

2. The electronic device of claim 1, wherein the power line communication circuit is communicatively coupled with the external device through an output circuit and configured to perform the power line communication through the output circuit.

3. The electronic device of claim 2, wherein the power line communication circuit further comprises a first external device and a second external device, and
  the power line communication circuit is communicatively coupled, with the first external device and the second external device.

4. The electronic device of claim 1, wherein the power line communication circuit is configured to:
  transmit a first data packet to the external device, and
  determine that transmission of the first data packet was successful, based on receiving a second data packet from the external device.

5. The electronic device of claim 4, wherein the second data packet is composed of two bits.

6. The electronic device of claim 4, wherein the processor is further configured to, based on the receiving the second data packet, increase a data count by the predetermined value.

7. The electronic device of claim 6, wherein the power line communication circuit is further configured to, based on not receiving the second data packet, check the data count.

8. The electronic device of claim 7, wherein the power line communication circuit is further configured to determine whether the transmission of the first data packet has failed, based on the checked data count.

9. The electronic device of claim 1, wherein the power line communication circuit is further configured to:
electrically couple the pull-up resistor of the power line communication circuit to the external device, after blocking the electrical connection between the regulator output node and the first output node, and after electrically connecting the pull-up resistor, perform the power line communication with the external device at the speed equal to or greater than the predetermined value.

10. The electronic device of claim 9, wherein the power line communication circuit is further configured to perform the power line communication with the external device at the speed equal to or greater than the predetermined value after a predetermined time duration has elapsed after the pull-up resistor has been coupled.

11. The electronic device of claim 10, wherein the regulator output node comprises a capacitor coupled to a node to which regulator power is supplied.

12. The electronic device of claim 1, wherein the processor is further configured to, based on receiving, from the external device, an end signal instructing to finish the high-speed communication:
electrically separate the pull-up resistor from the power line communication circuit, and
after electrically separating the pull-up resistor, electrically couple the regulator output node to the first output node by supplying power to the regulator output node and turning the power line switch on.

13. The electronic device of claim 1, wherein the power line communication circuit further comprises a data receiver configured to receive data from the external device, wherein the data receiver comprises an inverter.

14. A communication system comprising:
an external device including a near field communication circuit configured to perform near field communication with a mobile device and an electronic device;
the electronic device comprising:
a power line communication circuit configured to perform low-speed power line communication and high-speed power line communication; and
a processor configured to control the power line communication circuit and the near field communication circuit,
wherein the processor is further configured to:
transmit, using the low-speed power line communication, a start signal instructing an initiation of high-speed communication, the start signal having been received from the mobile device;
identify whether a communication mode of the electronic device has switched from a low-speed communication mode to a high-speed communication mode, and
based on identifying that the communication mode of the electronic device has switched to the high-speed communication mode, transmit, using the high-speed power line communication, data received from the mobile device.

15. The communication system of claim 14, wherein the processor is further configured to transmit the data received from the mobile device through the near field communication circuit through the power line communication circuit without storing the data received from the mobile device.

16. The communication system of claim 14, wherein the external device is electrically coupled with the electronic device through an output circuit configured to receive an input voltage from the electronic device.

17. The communication system of claim 16, wherein the processor is further configured to:
monitor the input voltage,
determine that communication mode switching of the electronic device has initiated, based on the input voltage being less than a first voltage, and
determine that the communication mode switching of the electronic device has completed, based on the input voltage being within a predetermined range from a second voltage that is different from the first voltage.

18. A method of performing high-speed power line communication by an electronic device, the method comprising:
based on receiving a start signal instructing an initiation of the high-speed power line communication, blocking an electrical connection between a regulator output node and a first output node of a power line communication circuit within the electronic device; and
after the blocking the electrical connection between the regulator output node and the first output node, performing the high-speed power line communication with an external device by:
electrically coupling a pull-up resistor of the power line communication circuit, and
coupling the first output node to a power supply voltage through the pull-up resistor or coupling the first output node to a ground voltage through the pull-up resistor, based on a logic level of input data of the power line communication circuit.

19. The method of claim 18, wherein the performing the high-speed power line communication comprises performing the high-speed power line communication with the external device through an output circuit which couples the power line communication circuit to the external device.

20. The method of claim 18, wherein the performing the high-speed power line communication further comprises performing the high-speed power line communication with the external device at a speed equal to or greater than a predetermined value after the pull-up resistor of the power line communication circuit is electrically coupled to the external device.

* * * * *